United States Patent
Ouji

(10) Patent No.: US 10,902,603 B2
(45) Date of Patent: Jan. 26, 2021

(54) METHOD OF SEGMENTING A 3D OBJECT IN A MEDICAL RADIATION IMAGE

(71) Applicant: Agfa HealthCare NV, Mortsel (BE)

(72) Inventor: Asma Ouji, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 39 days.

(21) Appl. No.: 16/468,069

(22) PCT Filed: Dec. 1, 2017

(86) PCT No.: PCT/EP2017/081111
§ 371 (c)(1),
(2) Date: Jun. 10, 2019

(87) PCT Pub. No.: WO2018/108569
PCT Pub. Date: Jun. 21, 2018

(65) Prior Publication Data
US 2020/0074636 A1   Mar. 5, 2020

(30) Foreign Application Priority Data

Dec. 13, 2016   (EP) .................................. 16203673

(51) Int. Cl.
| | | |
|---|---|---|
| *G06T 7/12* | (2017.01) | |
| *G06T 7/13* | (2017.01) | |
| *G06T 7/174* | (2017.01) | |
| *G06K 9/62* | (2006.01) | |
| *G06T 7/00* | (2017.01) | |

(52) U.S. Cl.
CPC .............. *G06T 7/12* (2017.01); *G06K 9/6267* (2013.01); *G06T 7/0012* (2013.01); *G06T 7/13* (2017.01); *G06T 7/174* (2017.01); *G06T 2207/10081* (2013.01); *G06T 2207/20104* (2013.01); *G06T 2207/30004* (2013.01)

(58) Field of Classification Search
None
See application file for complete search history.

(56) References Cited

U.S. PATENT DOCUMENTS

| 10,769,481 B2 * | 9/2020 | Vardhan .................. G06T 11/00 |
| 2007/0081710 A1 * | 4/2007 | Hong ........................ G06K 9/38 |
| | | 382/128 |

(Continued)

FOREIGN PATENT DOCUMENTS

EP   3 063 735 A1   9/2016

OTHER PUBLICATIONS

Hajiaghayi, Mandi, et al. "A 3-D active contour method for automated segmentation of the left ventricle from magnetic resonance images." IEEE Transactions on Biomedical Engineering 64.1 (2016): 134-144. (Year: 2016).*

(Continued)

*Primary Examiner* — Samah A Beg
(74) *Attorney, Agent, or Firm* — Stinson LLP

(57) ABSTRACT

On the basis of user input a set of contour points of a 3D object is detected in a number of 2D slice images representing the 3D object. Next a 2D object is segmented in each of the slice images by the set of contour points so as to obtain segmentation masks. Finally, by interpolation between computed segmentation masks, the 3D object is segmented.

2 Claims, 2 Drawing Sheets

(56) References Cited

U.S. PATENT DOCUMENTS

2007/0116334 A1* 5/2007 Fidrich ............... G06K 9/4638
382/128
2016/0140751 A1* 5/2016 Jafarkhani ........... A61B 5/0044
382/131

OTHER PUBLICATIONS

Preparata, Franco P., and Michael Ian Shamos. "Convex hulls: Basic algorithms." Computational geometry. Springer, New York, NY, 1985. 95-149. (Year: 1985).*

Official Communication issued in International Patent Application No. PCT/EP2017/081111, dated Apr. 18, 2018.

Jiang et al., "3D brain tumor segmentation in multimodal MR images based on learning population- and patient-specific feature sets", Computerized Medical Imaging and Graphics, vol. 37, Issues 7-8, May 31, 2013, pp. 512-521.

Badura et al., "3D Fuzzy Liver Tumor Segmentation", Lecture Notes in Computer Science, Information technologies in Biomedicine, vol. 7339, 2012, 13 pages.

Messay et al., "Segmentation of pulmonary nodules in computed tomography using a regression neural network approach and its application to the Lung Image Database Consortium and Image Database Resource Initiative dataset", Medical Image Analysis, vol. 22, Issue 1, Feb. 2015, pp. 48-62.

Meng et al., "Interactive Lung Segmentation Algorithm for CT Chest Images Based on Live-Wire Model and Snake Model", International Conference on Electronic Computer Technology, IEEE, ISBN: 978-0-7695-3559-3, Feb. 20, 2009, pp. 461-466.

Schenk et al., "Efficient Semiautomatic Segmentation of 3D Objects in Medical Images", Medical Image Computing and Computer-Assisted Intervention (MICCAI), ISBN: 978-3-540-41189-5, Feb. 11, 2004, pp. 186-195.

* cited by examiner

METHOD OF SEGMENTING A 3D OBJECT IN A MEDICAL RADIATION IMAGE

CROSS REFERENCE TO RELATED APPLICATIONS

This application is a 371 National Stage Application of PCT/EP2017/081111, filed Dec. 1, 2017. This application claims the benefit of European Application No. 16203673.5, filed Dec. 13, 2016, which is incorporated by reference herein in its entirety.

BACKGROUND OF THE INVENTION

1. Field of the Invention

The present invention relates to a method for segmenting a 3D object in a medical radiation image such as a Computed Tomography (CT) or a Magnetic Resonance image.

Typical objects that need to be segmented in an image are small organs (e.g. kidney) and tumors (e.g. brain tumor, liver tumor, etc.).

The invention is valuable for diagnosis, medical assessment and follow up. It is indeed important to segment a tumor or an organ to measure its size and compare it with previous measurements over time. It is also important to segment such objects to better visualize and analyse their shape and morphological aspects.

2. Description of the Related Art

Methods for segmenting objects in 3D images are known in the art.

A number of segmentation tools for dedicated organs or specific tumors have been described.

With respect to brain tumors the following publication describes a segmentation method: "3D brain tumor segmentation in multimodal MR images based on learning population- and patient-specific feature sets" by Jun Jiang, Yao Wu, Meiyan Huang, Wei Yang, Wufan Chen, Qianjin Feng, in Computerized Medical Imaging and Graphics Volume 37, Issues 7-8, October-December 2013, Pages 512-521.

Another publication relates to the segmentation of liver tumors: "3D Fuzzy Liver Tumor Segmentation" by Pawel Badura and Ewa Pietka in Information Technologies in Biomedicine, Volume 7339 of the series Lecture Notes in Computer Science pp 47-57.

Still another publication relates to the segmentation of lung nodules: "Segmentation of pulmonary nodules in computed tomography using a regression neural network approach and its application to the Lung Image Database Consortium and Image Database Resource Initiative dataset" by Temesguen Messay, Russell C. Hardie and Timothy R. Tuinstra, Medical Image Analysis, Volume 22, Issue 1, May 2015, Pages 48-62.

However, generic tools capable of segmenting any object within a 3D body reconstruction are quite rare.

Some semi-automated generic segmentation tools exist, such as the region grower described in Agfa HealthCare's European patent application EP 3063735 published Sep. 7, 2016.

Most of these tools are dedicated for specific types of objects.

Moreover these methods often require a lot of user interaction.

User interaction might lead to inaccurate results because the user might be not handy enough to perform very precise segmentation operations.

SUMMARY OF THE INVENTION

Preferred embodiments of the present invention provide an enhanced method for segmenting a 3D object in a medical radiation image that overcomes the above-mentioned disadvantages.

The above-mentioned aspects are realized by a method as set out below.

Specific features for preferred embodiments of the invention are also set out below.

Further advantages and embodiments of the present invention will become apparent from the following description and drawings.

The method of the invention generally comprises the following steps:

1. On the basis of user interaction, the contour of the object is detected in a number of 2D slice images selected out of a slice representation of a 3D radiation image comprising the 3D object,
2. In each of these slices a 2D object segmentation mask is generated on the basis of the contour points resulting from the previous step,
3. Finally the generated segmentation masks are subjected to interpolation so as to generate a segmented 3D volume.

The proposed method requires limited and intuitive user interaction. Only a rough few contours have to be drawn by the user, the other steps are performed automatically by applying image processing to the 2D slice images constituting the 3D volume.

The present invention is generally implemented in the form of a computer program product adapted to carry out the method steps of the present invention when run on a computer combined with user interaction to define some of the required seed points. The computer program product is commonly stored in a computer readable carrier medium such as a DVD. Alternatively the computer program product takes the form of an electric signal and can be communicated to a user through electronic communication.

BRIEF DESCRIPTION OF THE DRAWINGS

FIG. 1(a) shows a contour roughly drawn by a user, and FIG. 1(b) shows that the contour is automatically adjusted.

DETAILED DESCRIPTION OF THE PREFERRED EMBODIMENTS

Radiation images of 3D objects are typically generated by applying image recording techniques such as Computer Tomography or Magnetic Resonance Imaging.

The medical image representation generated by these techniques is a number of 2D slice images (also called 'planes') obtained by scanning the object.

In CT imaging the slice images are generated by exposing the object and recording images from different angles so as to produce cross-sectional (tomographic) images (virtual "slices") of specific areas of a scanned object.

In MR imaging the results form an exposure are also slice images.

The radiation used for imaging can thus be of different types such as x-rays, radio waves etc.

The invention is generally applicable to 3D imaging techniques that produce slice images. The input to the method of the present invention is a set of slice images, at least two, of a 3D image representation of an object.

Typically these slice images not only comprise the object but also include pixels surrounding the object. A segmentation process to separate the object from the remainder of the image is desired for some applications such as diagnosis, medical assessment and follow up.

In order to execute the segmentation method of the present invention, the user performs a first and single action on the display of a number of slice images out of the acquired image representation of the 3D image. This step is the only interactive one (the only step which requires user interaction). The results of the user action are fed into an image processing device that runs a software implementation of the method of the present invention as explained further on.

In a first step, the slice images that will be taken into account are displayed on a monitor.

Figure 1A:
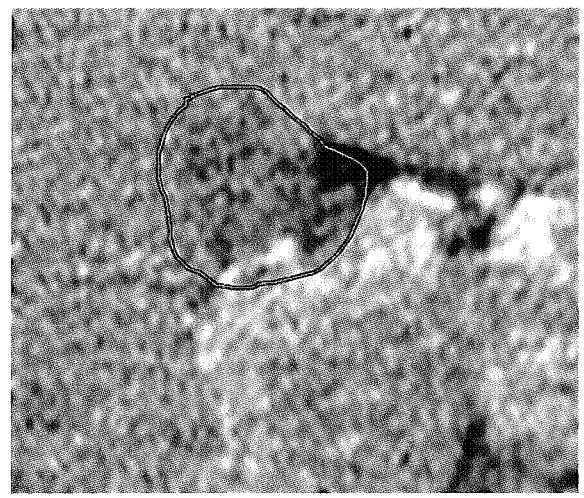
FIGS. 1(a) and 1(b) show contour detection based on user input on a 2D image.

The user draws few rough contours (FIG. 1(a)) around the object (tumor, organ, etc.) to be segmented. The contours are drawn on the displayed 2D slice images (planes).

Figure 1B:
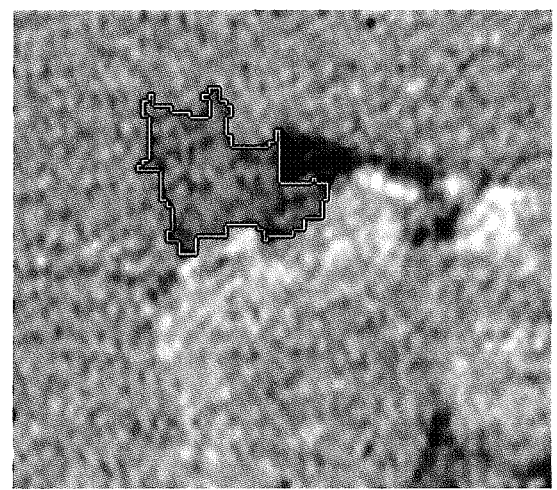

Next, each contour is automatically adjusted to fit the object boundaries. (FIG. 1(b)).

The contour is detected by looking for maximum gradient in the neighbourhood of the input pixels by computing the magnitude of the gradient image and selecting its maximum values in a sub-region surrounding the user input points (region size is described in the embodiment).

A Canny Edge Detector can also be used for this purpose but it is more time consuming. An example in which a Canny Edge Detector is used is described in the detailed embodiment section.

2D Image Segmentation

For each plane where a contour has been drawn, all pixels inside the contour are considered part of the object.

Figure 2:
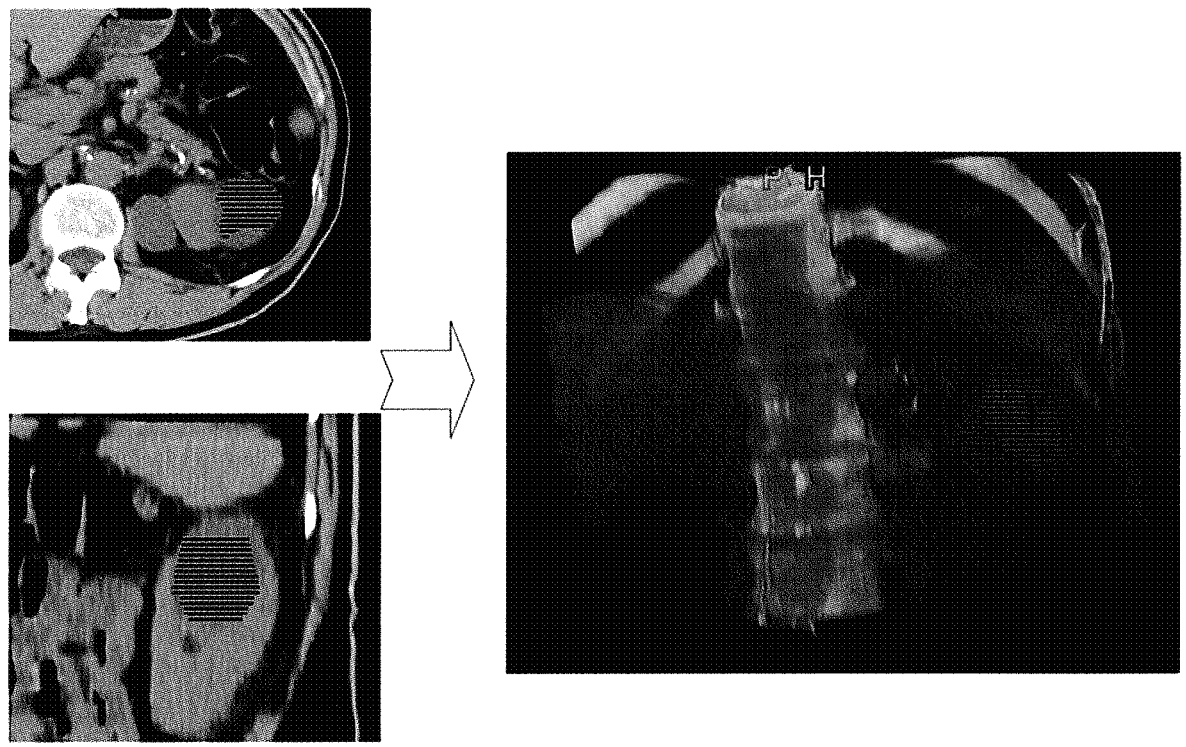
FIG. 2 shows a 3D mask interpolation from 2D masks. In the left picture 2D masks on axial and sagittal views are shown. In the right picture a 3D mask is shown.

All pixels outside the contour in the same plane are considered outside the object (e.g. in FIG. 2, left side images, striped pixels in the axial and sagittal planes are part of the segmentation mask and the remaining pixels are outside of it).

Hence, each pixel within a plane where a contour has been drawn is assigned one of types: inside the object or outside of it.

3D Mask Interpolation

The interpolation algorithm is fed with the in/out pixels of the segmentations masks created in previous step.

The interpolation algorithm could be for instance Random walker (Ref. L. Grady: Random Walks for Image Segmentation, IEEE Trans. on Pattern Analysis and Machine Intelligence, Vol. 28, No. 11, pp. 1768-1783, November, 2006.), region grower, convex hull or distance map thresholding.

Detailed Embodiment

The user draws few contours, typically two (or more if needed) contours in two parallel slices, or three contours in three perpendicular planes (axial, coronal and sagittal for instance).

Each contour is adjusted in real time (while it is drawn), in the same plane (image) where it is drawn, using Canny Edge detector (Ref. Canny, J., A Computational Approach To Edge Detection, IEEE Trans. Pattern Analysis and Machine Intelligence, 8(6):679-698, 1986) in the following way.

Initially (when the user starts drawing the contour), Canny Edge detector is locally computed on the neighborhood of the input pixel (on a 32×32 window around the pixel).

The first adjusted contour point is the closest one among the detected edges to the input point.

The next pixels are computed in a similar way starting from the last computed point each time, i.e. Canny Edges are locally computed on the neighborhood of the last adjusted contour point, and the next adjusted point is the closest one to the last computed point among the detected Edge points. The algorithm stops when the contour is closed.

Once all contours are completed, the 2-D image segmentation is performed as follows.

For each plane where a contour has been drawn, each pixel is classified as either inside or outside the final segmentation object. It belongs to the segmentation object if it is surrounded by contour points, and outside of it otherwise. Both inside and outside pixels will be used by the upcoming 3D segmentation step.

The 3D segmentation consists of two major steps:

Compute the 3D convex hull (Ref. Preparata, Shamos, Computational Geometry, Chapter "Convex Hulls: Basic Algorithms") containing all the pixels classified as inside the segmentation object within the previous step. The convex hull mask is refined to yield the final segmentation mask, using the following convex hull refinement algorithm.

Convex Hull Refinement Algorithm

The following steps are iteratively repeated until all pixels within the convex hull mask are processed.

1) Find all voxels in the convex hull not yet classified and adjacent to at least one already classified voxel (in or out voxel).

Let V be the set of these candidate voxels

2) Each voxel v in V is classified as in/out in the final segmentation object as follow:
   a. if the number of adjacent and already classified voxels is exactly one then v gets the same type as this neighbour;
   b. Otherwise v gets the type of the neighbour with the most similar intensity value.

3) If all voxels in the convex hull mask are classified the algorithm ends; otherwise, go to step 1).

The invention claimed is:

1. A method of segmenting a 3D object in a medical radiation image represented by 2D slice images, the method comprising:
   a) displaying at least two of the 2D slice images;
   b) manually drawing a contour line delineating a region of interest pertaining to the 3D object in the at least two of the 2D slice images displayed;
   c) feeding pixels of the contour line into a signal processor running a fitting algorithm and fitting the contour line to the 3D object by applying the fitting algorithm to the pixels;
   d) generating segmentation masks by segmenting in each of the at least two of the 2D slice images a 2D object based on the pixels of the fitted contour line applied to the fitting algorithm in step c); and
   e) performing interpolation on the segmentation masks so as to generate a segmented 3D object in which the interpolation on the segmentation masks is performed by:

computing a 3D convex hull containing all pixels classified as inside the 3D object in the segmentation mask; and refining the 3D convex hull to yield a final segmentation mask by iteratively performing the following steps within the 3D convex hull:
1) find a set V of candidate voxels in the 3D convex hull not yet classified as inside or outside the 3D object, and adjacent to at least one voxel already classified as inside or outside the 3D object;
2) classify each voxel v in the set V of the candidate voxels inside or outside the final segmentation object as follows:
    when a number of adjacent and already classified voxels is exactly one, then v is assigned a same type as an adjacent voxel;
    otherwise v is assigned a same type as the adjacent voxel with a most similar intensity value;
3) when all voxels in the convex hull are classified, then stop running the fitting algorithm; otherwise, go to step 1).

2. The method according to claim 1, wherein the fitting algorithm is based on a Canny Edge Detector algorithm.

\* \* \* \* \*